US 6,669,974 B2

United States Patent
Weldy et al.

(10) Patent No.: US 6,669,974 B2
(45) Date of Patent: *Dec. 30, 2003

(54) METHOD OF RAPID CURING AND PROCESSING BACON DERIVED FROM PORK PRODUCTS

(75) Inventors: Ralph E. Weldy, Schererville, IN (US); Brent Afman, Hammond, IN (US)

(73) Assignee: OSI Industries, Inc., Aurora, IL (US)

( * ) Notice: Subject to any disclaimer, the term of this patent is extended or adjusted under 35 U.S.C. 154(b) by 444 days.

This patent is subject to a terminal disclaimer.

(21) Appl. No.: 09/733,419

(22) Filed: Dec. 8, 2000

(65) Prior Publication Data

US 2001/0028911 A1 Oct. 11, 2001

Related U.S. Application Data

(63) Continuation-in-part of application No. 09/356,914, filed on Jul. 19, 1999, now Pat. No. 6,214,393, which is a continuation-in-part of application No. 09/119,428, filed on Jul. 20, 1998, now Pat. No. 6,051,264, which is a continuation-in-part of application No. 08/734,700, filed on Oct. 21, 1996, now abandoned, which is a continuation-in-part of application No. 08/437,445, filed on May 4, 1995, now Pat. No. 5,567,460.

(51) Int. Cl.⁷ ........................... A23L 1/314; A23L 1/318
(52) U.S. Cl. ........................ 426/243; 426/264; 426/641; 426/645
(58) Field of Search ................ 426/243, 264, 426/281, 641, 645

(56) References Cited

U.S. PATENT DOCUMENTS

| | | |
|---|---|---|
| 2,054,626 A | 9/1936 | Griffith |
| 2,716,425 A | 8/1955 | Yarber |
| 2,902,369 A | 9/1959 | Komarik |
| 2,974,047 A | 3/1961 | Holmes |
| 3,192,056 A | 6/1965 | Williams |
| 3,370,959 A | 2/1968 | Moore et al. |
| 3,595,679 A | 7/1971 | Schoch et al. |
| 3,674,504 A | 7/1972 | Lane |
| 3,741,777 A | 6/1973 | Wrobel et al. |
| 3,868,468 A | 2/1975 | Tompkin et al. |
| 3,906,115 A | 9/1975 | Jeppson |
| 4,029,824 A | 6/1977 | Langen |
| 4,038,426 A | 7/1977 | Jespersen et al. |
| 4,511,583 A | 4/1985 | Olson et al. |
| 4,547,379 A | 10/1985 | Moller et al. |
| 4,753,809 A | 6/1988 | Webb |
| 4,871,561 A | 10/1989 | Parker |
| 4,879,128 A | 11/1989 | Morin et al. |
| 4,940,590 A | 7/1990 | Williams et al. |
| 4,954,356 A | 9/1990 | Kappes |
| 4,957,756 A | 9/1990 | Olander et al. |
| 5,266,339 A | 11/1993 | Samson et al. |
| 5,472,722 A | 12/1995 | Burger |
| 5,567,460 A | 10/1996 | Afman |
| 6,045,841 A | 4/2000 | Singh et al. |

FOREIGN PATENT DOCUMENTS

| | | |
|---|---|---|
| DE | 27 16 425 A1 | 10/1978 |
| EP | 0 666 030 A1 | 8/1995 |
| EP | 0 923 872 A2 | 6/1999 |
| WO | WO 99/04654 | 2/1999 |

OTHER PUBLICATIONS

*Schiffner, et al., "Die Herstellung von Kochschinken und Formschinken und Formschinken unter bakteriellem Schutz, " Fleish, vol., 36, No. 3, 1982, pp. 53–57.

*Mattson, et al., "Bacon Precooked by Microwave Offers the Potential of Lowering Nitrosamine Levels," Food Product Development, 1978, p. 47.

*Marriott, et al., "Accelerated Dry Curing of Pork Legs (Hams): A Review," Journal of Muscle Foods, vol. 3, 1992, p. 159–168.

*1988 National Association of Meat Purveyors, "The Meat Buyer's Guide," pp. 122, 129 and 154, *Publication submitted in previously filed Appln. Nos. 09/356,914, 09/119, 428, 08/734,700 and U.S. Pat. 5,567,460. Therefore, copies are not submitted.

*Primary Examiner*—Arthur L. Corbin
(74) *Attorney, Agent, or Firm*—Bell, Boyd & Lloyd, LLC

(57) ABSTRACT

Methods of curing and processing pork bellies into fully-cooked bacon have been developed that eliminates both injecting the whole pork belly with pickle solution and smokehouse treatment thereafter. The method of the present invention immerses individual pork slices into a pickle solution sufficient for each slice to absorb 110%-120% of green weight and employs a single heating step that fully-cooks the slices to achieve the necessary weight reduction to meet the regulatory product definition for cooked bacon.

13 Claims, No Drawings

METHOD OF RAPID CURING AND PROCESSING BACON DERIVED FROM PORK PRODUCTS

RELATED APPLICATION

This is a continuation-in-part of U.S. patent application Ser. No. 09/356,914, filed Jul. 19, 1999, now U.S. Pat. No. 6,214,393, which is a continuation-in-part of Ser. No. 09/119,428 filed Jul. 20, 1998, now U.S. Pat. No. 6,031,264, which is a continuation-in-part of Ser. No. 08/734,700 filed on Oct. 21, 1996, now abandoned which in turn is a continuation-in-part of Ser. No. 08/437,445 filed May 4, 1995, now U.S. Pat. No. 5,567,460 issued on Oct. 22, 1996.

TECHNICAL FIELD

The present invention generally relates to curing and processing pork to produce bacon and, in particular, to a novel method of processing pork bellies into fully cooked bacon without need of injecting pickle solution into the whole pork belly or smokehouse treatment thereafter.

BACKGROUND OF THE INVENTION

The term "bacon" broadly defines a category of cured and processed pork bellies. Most commonly, pork bellies are cured and processed into strip form bacon or circular form. The weight and yield of bacon is precisely defined by federal regulation. For example, for cured pork bellies to be labeled as "uncooked" bacon, the cured pork bellies must have a weight not exceeding the weight of uncured pork bellies. Similarly, for cured pork bellies to be labeled as "cooked" or "precooked" bacon, the cured pork bellies must have a yield not more than 40% the weight of uncured pork bellies. That is, 60% shrinkage from the initial weight of the pork belly, also known as the "green weight," is required.

The traditional process of curing pork bellies to create a bacon product entails the infusion of a dry cure or liquid pickle solution into the pork bellies. Infusion of the pickle solution creates an infusion weight that exceeds green weight. Depending on manufacturing capabilities and customer preference, infusion weight may be anywhere from 105% to 115% of green weight. To meet the regulatory product definitions of either uncooked, par-cooked or cooked bacon, a degree of weight loss must occur equal to or greater than the added weight of the injected pickle solution, i.e. the finished weight must be equal to or less than the meat portion prior to the injection of the pickle solution. Hence, to obtain the necessary weight reduction to meet the regulatory product definitions for bacon, the prior art has subjected the infused pork bellies to a prolonged low temperature cook cycle.

Historically, this slow cooking took place in smokehouses which achieved the necessary weight reduction and also imparted a smoke flavor characteristic of bacon. Modern techniques employ cooking ovens which heat the product to a core temperature of 115°–140° F. during a 4 to 24 hour cook cycle. This slow, low temperature heating produces a 10%–15% loss of injected weight without reaching temperatures to par-cook the pork bellies. The "smokehouse" treatment cooks-off the liquid portion of the pickle solution leaving behind the seasoning carried in the liquid thus curing the pork bellies and imparting the characteristic bacon taste. After the smokehouse treatment, the cured pork bellies are substantially fluid free.

Because of the use of modern slow cooking ovens, the smoke flavor is now produced in different ways. For circular bacon, created by two individual pork bellies cold formed together and encased within a casing, a smoke flavoring agent is added to the pickle solution. With strip bacon, the entire pork belly may also be subject to an atomized spray of smoke flavoring agent within the cooking chamber of the oven.

For fresh bacon, the "smokehouse" treatment causes adequate weight reduction to return the cured pork belly to green weight and therefore within the regulatory product definition for fresh bacon. After the smokehouse treatment, cured pork bellies intended to be sold as fresh bacon are weighed to assure the necessary loss of 10% weight from infused weight. Next, the internal temperatures of the cured pork bellies are chilled from 115°–140° F. to 20°–30° F. to facilitate slicing. The product is sliced and then packaged.

However, for fully cooked bacon, additional weight reduction is necessary to achieve shrinkage greater than 60% from green weight to bring the product within the definition for "fully cooked" bacon. After completion of the smokehouse treatment, cured pork bellies intended to be sold as cooked are weighed to assure loss of at least 10% weight from infused weight. The internal temperatures of the cured pork bellies are chilled from about 140° F. to 20° F. Again, such chilling is done to facilitate slicing. The bellies are sliced and then can be further cooked, typically in microwave ovens for about 1½ to 2 minutes depending on microwave amperage, conveyor belt speed through the microwave ovens. Such further cooking causes the necessary 60% shrinkage from green weight to bring the cured and now fully cooked pork bellies within the regulatory definition for fully cooked bacon.

Hence, curing pork bellies intended as "fresh" bacon uses single step cooking employing solely the smokehouse treatment while cured pork bellies intended as "cooked" bacon uses a two step cooking employing both smokehouse treatment and a second cooking step. The prior art teaches that smokehouse treatment was necessary for curing pork bellies whether they were intended to be sold as fresh or fully cooked bacon.

U.S. Pat. No. 4,957,756 to Olander et al. suggests a method of eliminating smokehouse treatment of pork bellies. However, this method requires a lengthy step of holding the pork belly injected with pickle solution for 32 to 42 hours at temperatures of 40 to 45°. Olander teaches that such holding of the injected pork belly is necessary to achieve adequate dispersal of the pickle solution throughout the pork belly. Such a step greatly increases the costs of producing bacon even though smokehouse treatment has been eliminated.

Further, Olander and the art require injecting pickle solution into the pork belly or other pork muscle parts as a means of adequately dispersing the solution throughout the pork muscle. However, pickle injection into the pork muscle is both costly and time consuming.

It is apparent from the above that prior art methods are both time and energy intensive and contribute greatly to the cost of producing bacon. But with the market for fully cooked bacon product gaining in consumer popularity, prior to the development of the present invention, a need existed for methods to cure and process pork bellies and other pork parts by reducing the costs and time associated with the steps of pickle injection and smokehouse treatment.

SUMMARY OF THE INVENTION

According to the present invention, a novel method of curing and processing pork into fully cooked bacon has been developed that eliminates both pickle injection and smokehouse treatment with a significant reduction in processing time and cost. Essentially, the methods of the present invention immerse individual slices of a selected pork portion in a bath of pickle solution for a time period sufficient for the solution to permeate each slice. Thereafter, each slice is fully cooked to achieve the necessary weight reduction to meet the definition for cooked bacon The time period for immersion of the slices to obtain 105%–120% of green weight has been found to be in a range of about 3–30 seconds. Thereafter, the permeated slices are not subject to smokehouse treatment. Rather, to achieve at least a 10% weight reduction, the method of the present invention eliminate smokehouse treatment by exposing each permeated slice to rapid heating.

Further, even though the methods of the present invention eliminate both injecting pickle solution into a whole pork belly and smokehouse treatment by employing only a slightly longer single step cooking results in a more than 60% shrinkage from infused weight results sufficient to meet the regulatory definition for cooked bacon. Yet, the methods of the present invention result in product that when fully cooked, has the aroma, flavor, texture and appearance of bacon produced by smokehouse treatment with curing and processing time.

Other advantages and aspects of the present invention will become apparent from the following detailed description of the invention.

DETAILED DESCRIPTION

While this invention is susceptible of embodiment in many different forms, there is herein described in detail preferred embodiments of the invention with the understanding that the present disclosure is to be considered as an exemplification of the principles of the invention and is not intended to limit the broad aspect of the invention to the embodiments illustrated.

The method of the present invention eliminates (1) injecting whole pork bellies with a liquid pickle solution, (2) a 32 hour to 42 hour holding period to achieve pickle solution dispersal throughout the pork belly as required by the prior art, (3) smokehouse treatment, (4) post-smokehouse weighing of product, and, (5) the need to chill smokehouse treated pork bellies from high internal meat temperatures of 140° F. to slicing temperatures of 20° F. The elimination of theses steps results in dramatic savings in processing times and costs.

The following Example describes in more detail the method of the present invention.

EXAMPLE

Fully Cooked Strip Form Sliced Bacon

Pork bellies of a selected weight and size chilled to 18° F. to 24° F. are trimmed in the manner known in the art. Instead of injecting a seasoned pickle solution into the whole pork belly as is known in the art, the belly is sliced to form about 6 to 16 slices per one inch thickness. Slicing of the pork bellies increases the surface area to be exposed to a seasoned liquid pickle solution.

Next, the individual slices are immersed in a marinade tank containing a seasoned liquid pickled solution of the type commonly used in the art. The seasoned pickle solution may have any composition known in the curing art but smoke flavoring agent must be added. The slices remain immersed in the marinade tank for about 3 to 30 seconds. This time period has been found sufficient for each slice to absorb about 110%–120% of green weight.

At this point, prior art techniques also teach smokehouse treatment of the pork bellies. Instead, in accordance with the present invention, the individual slices are then immediately transferred to a cooking device. This device may include a conveyor belt having a heat conductive surface (also known as "belt grilling") or, as preferably practiced, by passing the slices on a conveyor belt through one or more microwave cooking chambers. With reference to the preferred commercial operation herein described, a multi-cavity Ferrite™ microwave unit was employed. However, one example of cooking the slices is to set the transmitters of each cavity at maximum amperage setting levels of 4.20. This amperage setting achieves a temperature within each microwave cavity of about 220° F. Conveyor belt speeds had to be decreased from 600 inches/minute for sliced product that was subject to smokehouse treatment to 550 inches/minute for sliced product processed according to the present invention. Decreased belt speed increased total dwell time within all microwave cooking cavities from approximately 1 minute, 10 seconds to 1 minute, 20 seconds, or about a 15% increase in dwell time. Slice product emerging from the microwave cooking chambers possesses the appearance, aroma, taste and texture of product processed according to the prior art two step cooking cycle.

By eliminating the steps of (1) injecting pickle solution into a whole pork belly, (2) the holding step required in the art, e.g. U.S. Pat. No. 4,957,756, (3) smokehouse treatment), (4) post-smokehouse weighing of product, and (5) the need to chill smokehouse treated pork bellies from internal meeting temperatures of 140° F. to slicing temperatures of 30° F., the present invention achieves substantial reductions in cost and processing time for producing par-cooked bacon products. For example, by eliminating the cure time for an injected whole pork belly and by eliminating the 4 to 5 hours necessary for smokehouse treatment, it has been estimated that substantial savings could be achieved in commercial scale production of par-cooked bacon products.

While the specific embodiments have been illustrated and described with reference to a preferred commercial operation, numerous modifications come to mind depending on the variables presented by other commercial operations, all without significantly departing from the spirit and intent of the invention. For example, the methods of the present invention may also be practiced on other portions of pork muscle such as loins, ham, picnics, shanks and butts. The scope of protection is only limited by the scope of the accompanying Claims with reference to this specification.

We claim:

1. A method of curing and processing pork bellies to produce fully cooked sliced bacon using a single heating step and omitting the steps of injecting pickle solution into the whole pork belly and smokehouse treatment thereafter, consisting essentially of the steps:

providing chilled pork bellies having a preselected weight;

slicing the chilled pork bellies into individual slices;

immersing the individual slices into a seasoned liquid pickle solution;

marinating the individual slices in the seasoned pickle solution for a time period sufficient for the pickle solution to permeate each slice;

removing the permeated individual slices from the pickle solution;

heat reducing the permeated slices to a finished weight to at least 60% of the preselected weight; and then continuing heating of the slices until the slices are fully cooked.

2. The method of claim 1 wherein the step of marinating further includes:

retaining the individual slices within the liquid pickle solution to obtain an infused weight exceeding the preselected weight.

3. The method of claim 2 wherein the infused weight is within the range of 105% to 120% of the preselected weight.

4. The method of claim 1 where the pork bellies are chilled to between 18° F. to no more than about 24° F.

5. The method of claim 1 wherein the pickle solution includes a flavoring agent for imparting a smoke taste to the pork bellies.

6. The method of claim 1 wherein the slices are selected from the group consisting of strip form or circular form.

7. The method of claim 1 wherein the step of heating the slices includes:

passing the slices through a microwave cooking chamber.

8. The method of claim 1 wherein the step of heating the slices includes:

conveying the slices on a belt grill.

9. The methods of claim 1 or 2 wherein the step of marinating includes immersing the individual slices within the liquid pickle solution for between about 3 seconds to about 30 seconds.

10. A method of curing and processing pork portions to produce strip slices of fully cooked and cured pork products using a single heating step and omitting any smokehouse treatment and prolonged chilling and holding of injected bellies, consisting essentially of the steps of:

providing individual slices of chilled pork portions of a preselected weight, the pork portions being selected from the group consisting of bellies, loins, hams, picnics, shanks and butts;

immersing the sliced pork portions in a bath of seasoned liquid pickle solution for a sufficient time period for each slice to obtain a permeated weight exceeding the preselected weight;

exposing the permeated slices to a heat source to rapidly eliminate no more than 60% of preselected weight; and continuing heating of the slices until the slices are fully cooked.

11. The method of claim 10 wherein the individual slices are chilled to between 18° F. to no more than about 24° F.

12. The method of claim 10 wherein the pickle solution includes a flavoring agent for imparting a smoke taste to the pork bellies.

13. The method of claim 10 wherein the heating source includes a plurality of tandem arranged microwave cooking chambers.

* * * * *